United States Patent Office 2,728,633
Patented Dec. 27, 1955

2,728,633

PRODUCTION OF URANIUM AND THORIUM COMPOUNDS

Thomas Victor Arden, Francis Hereward Burstall, Reginald Patrick Linstead, and Ronald Alfred Wells, Teddington, England No Drawing. Application April 18, 1949, Serial No. 88,238

Claims priority, application Great Britain April 22, 1948

9 Claims. (Cl. 23—14.5)

This invention relates to the production of uranium and/or thorium from ores or ore concentrates and is concerned with the preparation of compounds of such metals of a high degree of purity from natural source materials. The invention is also applicable to the purification of uranium and thorium metals or their compounds.

An object of the invention is to provide a simple and efficient process whereby substantially all impurities which may accompany uranium or thorium may be removed, leaving a purified uranium or thorium compound which may be converted into a pure oxide or the metal.

The invention consists in a method of purifying compounds of uranium and/or thorium, wherein an impure compound of uranium or thorium or compounds of both are extracted with an organic solvent for the compound or compounds in the presence of an adsorbent substance which has greater retentivity for impurities present than for the uranium and/or thorium.

The invention further consists in a method of recovering uranium and/or thorium from ore or ore concentrate in a pure state, according to which uranium and/or thorium values of the ore or ore concentrate are brought into solution and the solution is extracted with an organic solvent for uranium and/or thorium compounds in the solution in the presence of an adsorbent substance which has greater retentivity for impurities present than for the uranium or thorium.

Thus a solution of a uranium compound and impurities in an organic solvent, preferably acidified, may be brought into contact with an adsorbent material having the qualities described above and the purified uranium compound may be recovered from the solution. Alternatively a mixture containing uranium in the form of an aqueous solution, semi-solid, slurry or solid may be brought into contact with a mass of adsorbent material having the qualities described above and the uranium compound in the adsorbent may be extracted with an organic solvent, preferably acidified, for the uranium compound, the extract being preferably caused to pass through a packed mass of the said adsorbent material, desirably in the form of a column.

The preferred adsorbent material is cellulose, the retentive properties of which for many metals may be enhanced by an activation of treatment, e. g. by treatment with nitric acid. A very satisfactory and preferred form of cellulose for use in carrying out the invention is a cellulosic pulp of the kind employed in making absorbent paper, especially ash-free cellulose prepared for filtering purposes. Wood pulp as used for the manufacture of nitrocellulose is also a satisfactory form of cellulose for use in accordance with the invention.

Other forms of cellulose having relatively long fibres for example cotton, specifically scoured American cotton and cotton wool, show adsorption qualities suitable for use in carrying out the invention, which qualities may be improved by an activation treatment described below. When they are employed as packed masses in the form of a column, however, evidence of trailing of impurities has been noticed, owing possibly to the difficulty of obtaining the even packing necessary for carrying out the invention.

Cellulose acetate also shows desired adsorbent qualities but it has not proved as satisfactory as the preferred form of cellulose. Methyl cellulose has similar properties to paper pulp in the unactivated state.

Other adsorbent materials which have been found to have qualities desirable for the invention are activated alumina and calcined ball clay. The former has been found to be especially effective in the retention of boron, arsenic and molybdenum, although inferior to cellulose pulp in the retention of iron and vanadium. Calcined ball clay, unfortunately, may contain iron, which is leached out in the process and will contaminate the uranium. An adsorbent mass constituted by a plurality of adsorbent materials may be employed according to the invention, so that use may be made of high retentive properties of particular adsorbents for certain impurities and compensation made for failings of other adsorbents. One such adsorbent mass may be formed partly of cellulose pulp and partly of activated alumina.

Alginic acid and ion exchange resins, particularly sulphonated cross-linked polystyrene, have been found to give a uranium product of about 99.5 per cent purity when employed as adsorbents for carrying out the invention, but the yields of uranium were low especially in the latter case.

Uranium- and thorium-containing substances treated according to the invention are preferably in the form of nitrates, in solution, or solid or semi-solid. Thus ores or other sources of uranium and thorium are desirably brought into solution in nitric acid and the resulting solution adjusted to give a high concentration of salts in the aqueous phase. The concentration of nitric acid in the resulting aqueous solutions can be varied over a wide range (0 to 70%) while still maintaining a strong retention of impurities by the adsorbent.

The preferred organic solvent is diethyl ether. Methyl acetate, butyl acetate, methyl iso butyl ketone and nitromethane also are effective solvents giving high yields of uranium in a good state of purity when employed with nitric acid in accordance with the invention; but from the point of view of cost, stability to nitric acid and ease of recovery, diethyl ether is preferred to any of these.

The organic solvent is desirably dried, for example over calcium chloride, before use, since the presence of water in the extracting solvent has been found to increase the speed of movement of impurities through the adsorbent mass. The organic solvent is preferably acidified with nitric acid (1.42 s. g.) in amount equal to 3 to 5 per cent by volume of the solvent use in recovering uranium. The quantity of solvent, e. g. diethyl ether, necessary to extract the uranium decreases with increase of nitric acid concentration. The effect of decreasing the nitric acid content of the solvent is to slow down the rate of extraction of uranium and to increase the effective retention of other elements by the preferred adsorbent (cellulose) used according to the invention. The presence of phosphate ion also results in a slowing down of the speed of extraction of uranium but quantitative removal of this element is still possible with diethyl ether containing 5 per cent by volume of nitric acid, although a large quantity of solvent is required for such extraction.

In carrying the invention into effect according to one method, impure or crude uranyl nitrate, obtained for example by treatment of ore, may be placed as a solid or slurry on the top of a mass of adsorbent arranged in the form of a column, the adsorbent having been moistened with an organic solvent e. g. diethyl ether containing nitric acid. Further organic solvent containing nitric acid is then poured over the impure uranyl nitrate and allowed to pass through the column of adsorbent. The emergent organic solvent will contain substantially all the uranyl nitrate and the impurities will be largely retained by the adsorbent.

In an alternative method a concentrated aqueous solution of impure or crude uranyl nitrate containing nitric acid is absorbed in a quantity of adsorbent sufficient to absorb all the free nitric acid solution and the whole placed on the top of mass of adsorbent as described above, pressed down to become part of the mass and leached with organic solvent containing nitric acid.

According to a further method, a solution of impure or crude uranyl nitrate in an organic solvent containing nitric acid may be passed through a column of adsorbent as described above and the contained uranyl nitrate washed through by means of further amounts of such organic solvent. A modification of this method involves pre-treating the solution of impure or crude uranyl nitrate with a small quantity of adsorbent and then passing the solution and subsequent washings through a column of the adsorbent as before. Alternatively, where solution of the uranium compound in organic solvents is involved, impurities may be removed by successive treatments of the solution with a small quantity of the adsorbent.

The preferred adsorbent material of the invention may be prepared in the following manner. Ash-free blocks of paper pulp are treated with nitric acid in quantity sufficient to wet the pulp; for example a quantity of 3 litres of 10% nitric acid per lb. of pulp has been employed. After a few minutes water is added to form a slurry from which the pulp is filtered, and it is then washed to remove free nitric acid. The resulting wet activated pulp is partially dried, as in a vacuum oven, and then placed while still slightly moist in a storage vessel containing diethyl ether. The resulting pulp is referred to hereinafter as "prepared paper pulp." Alternatively unsized paper of low ash content, such as is used as filter paper, may be mechanically broken up in the presence of water, and the slurry produced partially dried in a vacuum oven and then treated with nitric acid and further processed as described above. It has been found that oven-dried pulp tends to form lumps difficult to break up if allowed to lose all residual moisture, and that by keeping it moist with ether the tendency to lose such moisture is reduced.

Activation of the pulp may also be effected by treatment with a 4 per cent hypobromite solution in place of nitric acid. Mercerisation with 18 per cent caustic soda solution is a possible alternative treatment and it gives a particularly retentive adsorbent.

When a sample of an ore dissolved in nitric acid and containing uranyl nitrate is introduced into a tube containing a column of the above mentioned prepared pulp some 25 cms. deep, and the solution of the sample and column are leached with diethyl ether containing nitric acid, the uranyl nitrate passes through the column and the uranium may be recovered quantitively from the effluent. Other elements which may be present in the sample are largely retained by the pulp or travel along the column more slowly than the uranium so allowing of a separation of the latter from substantially all impurities present. Thus it has been observed that during the leaching necessary to recover the uranium, alkali metals show little movement in the column, alkaline earth metal little or no movement; copper, tin, cobalt, columbium, little movement; and beryllium, zinc, cadmium, aluminium, rare earths, germanium, lead, chromium, tungsten, manganese, nickel and thallium no movement. Mercury and selenium showed considerable movement but extraction of uranium was completed before they appeared in the effluent ether. Vanadium and molybdenum also moved down the column but more slowly than uranium, while, if they were reduced by addition of ferrous sulphate to the pulp containing the sample, movement ceased. Bismuth moved rapidly down the column. Iron moved slowly down the column. Phosphorous as phosphoric acid and boron as boric acid passed through the column, and the presence of phosphate ions necessitated the use of larger quantities of solvent for the extraction of uranium.

Thorium is extracted in the column, the amount passing through depending on the amount of nitric acid in the diethyl ether. Extraction in the absence of nitric acid and up to 3 per cent acid is very small, while in the presence of 10 per cent nitric acid in the ether it is about 95 per cent of the total thorium whereas at 12.5% nitric acid extraction is complete. Thus the process of the invention as described above for uranium may be applied to the extraction of thorium from its ores if such a concentration of nitric acid is employed. Phosphoric and oxalic acids have the effect of holding back thorium in the column when the ether contains 5 per cent nitric acid.

The presence of chloride or bromide ions in the sample of uranyl nitrate extracted results in greatly increased extraction of tin and iron, and should therefore be avoided.

Platinum is partially extracted in the column, colloidal gold may pass through the column. Both metals are retained by prior treatment of the sample with ferrous sulphate.

The following examples will serve to illustrate the invention as applied by way of example to winning uranium and thorium from their ores.

*Example 1*

Pitchblende ore containing 57.3 per cent $U_3O_8$ was decomposed with nitric acid (50 per cent w./v.) to give the whole of its uranium content as uranyl nitrate, the acid being employed in the proportion of 104 ml. to each 100 gm. of ore. To the solution so obtained was added for each 100 gm. ore 200 ml. of dried diethyl ether containing 3 per cent by volume of nitric acid and 28 gm. of prepared paper pulp as described above.

A column of the prepared paper pulp was then prepared employing a glass, silica or ceramic tube about 2 cm. in diameter with a stop cock at one end and some 40 cm. long as the containing vessel. The inner wall of the tube after being cleaned was coated dichlorodimethyl silane, as by shaking a small quantity of the compound in the tube and removing the excess. The wall was finally washed with alcohol. The water-repellent qualities given to the wall by this treatment eliminated any tendency of aqueous solution to creep along the wall. Into the tube was introduced a perforated plate to support the column and diethyl ether-nitric acid mixture, of the composition employed above to treat the ore solution, in quantity sufficient to rise to about 12 cm. above the supporting plate. Prepared paper pulp was added to the ether in small quantities at a time, each addition being gently pushed down with a plunger having a head slightly smaller in diameter than the inside diameter of the tube, and then subjected to agitation by a brisk up and down movement of the plunger to break up any segregated pieces. Additions of pulp were continued in this way until a column of pulp substantially 25 cm. long was obtained. In this way a uniform column of pulp was obtained through which the ether passed freely leaching all parts equally. Other means of packing to achieve this end may equally be employed. The volume of the column of adsorbent so formed should be approximately 115 mls. for each 100 gm. of ore treated.

If the pulp was not prepared from cellulose of very low ash content, the column so prepared should be leached with 200-300 ml. of the ether-nitric acid mixture for each 80 cubic centimetres' of column, the leachings being retained for recovery of ether.

The ethereal solution of uranyl nitrate (and impurities) prepared from the ore as set out above was transferred to the top of the column and the stop cock opened to allow a slow trickle of solvent to run out into a collecting vessel. The residue of pulp and ethereal uranyl nitrate solution was washed and stirred with successive portions of ether-nitric acid mixture of approximately 200 ml. for each 100 gm. of ore treated, the washings being added to the top of the column. The washing was continued until uranium no longer appeared in the extract issuing from the bottom of the column. In all approximately 2 litres of diethyl-ether nitric acid mixture was employed for each 100 gm. of ore.

To the ethereal extract so obtained water was added in amount equal to 300 ml. for each 2 litres of extract and the ether distilled off. The residual aqueous layer was then dried and the uranyl nitrate calcined to yield $U_3O_8$ of high purity as shown by chemical and spectrographic analysis. Yields of 99.8 to 100 per cent of the uranium in the ore have been obtained in this way.

The ether distilled from the extract may be neutralised with alkali, treated with alkaline permanganate, distilled, dried over calcium chloride and finally distilled, when it will be suitable for further use.

In operating as described above, it was found that vanadium present as impurity moved only about three quarters of the length of the adsorbent column, iron was retained at the top of the column where traces of copper were also detected.

*Example 2*

A low grade siliceous uranium ore of the austenite-torbernite type which assayed at 0.27 per cent $U_3O_8$ was leached with dilute sulphuric acid and the uranium in the leach liquor precipitated as hydrated oxide with caustic soda and magnesia. The resulting concentrate assayed at 20.0 per cent $U_3O_8$. It contained as impurities iron, magnesium, copper, zinc, sodium, sulphate and phosphate.

The concentrate was dissolved in nitric acid (160 ml. 1.42 $HNO_3$ to each 100 gm. concentrate) and mixture diluted to 300 ml. with water for each 100 gm. concentrate.

Prepared paper pulp as previously described was added to the resulting aqueous liquor in quantity sufficient to absorb the liquor completely. The wad of material so obtained was transferred to a sintered glass filter having a half inch layer of prepared pulp thereon. The wad and pulp were leached with diethyl ether (containing 5 per cent by volume of nitric acid) in amounts equal to 100 ml. for each 110 gm. of concentrate taken. The mass was stirred during leaching and the extract separated through the sintered glass, by use of slightly reduced pressure. After six such leachings the total filtrate containing the uranyl nitrate was passed through a column of prepared paper pulp formed as described in Example 1, and washed through with further diethyl ether-nitric acid mixture until all the uranium had passed through. A volume of solvent equal to 1800 ml. for each 100 gm. concentrate was required for this purpose.

The extract was further treated to recover $U_3O_8$ as described in Example 1.

A recovery of 99.9 per cent of the uranium in the concentrate was obtained as $U_3O_8$ of high purity as shown by spectrographic analysis and X-ray diffraction examination in comparison with a standard sample of uranium oxide.

A reduction in the amount of diethyl ether required for each extraction may be made by passing enough of it through the column to remove about 98 per cent of the uranium present and passing on such extract for recovery of uranium and solvent. In the case of Examples 1 and 2 this would amount to approximately one half of the total quantity of ether-nitric acid mixture used for the leaching operation. The small quantity of uranium remaining is extracted by further ether-nitric acid mixture and the extract is collected separately and used for initial leaching of a fresh batch of ore solution. This method of operation not only provides a substantial reduction in the amount of fresh solvent needed for treatment of each batch of ore, but also assists in maintaining a high purity of the product, since carry through of impurities from the adsorbent column is more likely at the end of the extraction process than in the early stages.

*Example 3*

A sample of monazite sand containing an equivalent of 0.25 gram $ThO_2$ was decomposed with aqueous hydrofluoric acid and the phosphoric acid removed with the excess hydrofluoric acid. The insoluble fluorides were then decomposed by fusion with potassium hydroxide and the melt leached with water. The insoluble hydroxides were separated, dissolved in nitric acid and any ceric salt reduced to cerous nitrate by means of hydrogen peroxide. The resulting mixture was soaked up in a wad of cellulose pulp (3 to 5 gm. was found sufficient) and transferred to the top of a 15 cm. column of prepared paper pulp formed as described in Example 1 but employing ether containing 12.5 per cent nitric acid. The thorium nitrate in the wad at the top of the column was then extracted with 600 ml. of diethyl ether containing nitric acid (525 ml. dry diethyl ether and 75 ml. nitric acid d. 1.42). The thorium was completely extracted whereas other metals, particularly elements of the rare earth series, were retained on the column. The thorium was recovered from the emergent solution by partial neutralisation with ammonia, distillation of the ether, precipitation of thorium as oxalate by means of oxalic acid and conversion of the oxalate to thorium oxide by calcination at 850° C. The yield of thorium was quantitative and the product was of high purity.

With crude monazites containing zirconium, extraction of the latter with the thorium is avoided by addition of tartaric acid (in quantity about equal to the weight of the sample taken) to the liquid mixture before transfer to the top of the cellulose column. Scandium is also prevented from passing through the column by the presence of tartaric acid.

*Example 4*

A sample of uranothorianite containing 35.5 per cent $U_3O_8$ and 48.7 per cent $ThO_2$ was treated with nitric acid (d. 1.42) to bring most of the ore into solution. The small residue was fused with caustic potash, the melt leached with water, acidified with nitric acid and added to the main solution. The latter was evaporated to dryness, treated with water (5 ml.), concentrated nitric acid (2 ml.) and hydrogen peroxide (0.5 ml. of 20 vol. solution) and heated, all amounts specified being for each half gramme of ore treated. The cooled mixture was poured into a tube containing a 15 cm. column of prepared cellulose formed as described in Example 1. The uranium present was then extracted by passing diethyl ether containing 3 per cent nitric acid through the column (200 ml. of the ether being used per 0.5 gm. ore treated). Purified uranium in quantitative yield was obtained in the emergent solution, whereas thorium remained in the column. The uranium and ether were recovered as described in Example 1.

Diethyl ether containing 12.5 per cent nitric acid by volume (600 ml. per 0.5 gm. ore) was then passed through the column to extract the thorium, which was obtained quantitatively in a pure condition and recovered from the solvent eluant as described in Example 3.

We claim:

1. A method of recovering thorium in a pure state from its ore, wherein the thorium values in the ore are converted into thorium nitrate, and the latter in contact with a mass of cellulose pulp is extracted with diethyl ether containing approximately 12½ per cent by volume of nitric acid (d.=1.42), whereby an ether extract is obtained containing the thorium nitrate substantially free from impurities.

2. A method of recovering uranium and thorium in a pure state from material containing the same, wherein the uranium and thorium values in the material are converted into nitrates, and the nitrates in contact with a mass of cellulose pump are first extracted with diethyl ether containing from 3 to 5 per cent by volume of nitric acid (density substantially 1.42 g./cc.) so as to obtain the uranyl nitrate present in ethereal solution, and are then extracted with diethyl ether containing approximately 12.5 per cent by volume of nitric acid so as to obtain the thorium nitrate present in ethereal solution.

3. A method according to claim 2, wherein the cellulose pulp is of the kind employed in manufacturing absorbent paper, and is in the form of a column through which the acidified diethyl ether solution of nitrate passes.

4. A method of purifying a compound of a metal of the group consisting of uranium and thorium, wherein the impure compound in solution in nitric acid is extracted with diethyl ether containing a small proportion of nitric acid, and the extract is caused to pass through an adsorbent column of a substance selected from the group consisting of cellulose, cellulose acetate, activated alumina, calcined ball clay, alginic acid and ion exchange resins, and a purified metal compound is recovered from the extract.

5. A method according to claim 4, wherein diethyl ether containing from 3 to 5 per cent by volume of nitric acid (d.=1.42) is employed for extracting uranium, and diethyl ether containing approximately 12.5 per cent by volume of nitric acid (d.=1.42) is employed for extracting thorium.

6. A method according to claim 4, wherein the adsorbent column is formed partly of cellulose pulp and partly of activated alumina.

7. A method of purifying a substance of the group consisting of uranyl nitrate and thorium nitrate, wherein the impure substance is extracted with diethyl ether containing a small proportion of nitric acid, and the extract is brought into contact with prepared paper pulp, preferably in the form of a column.

8. A method of purifying a compound of a metal of the group consisting of uranium and thorium wherein the impure compound in solution in nitric acid is extracted with diethyl ether containing a small proportion of nitric acid and the extract is caused to pass through an adsorbent column of activated alumina.

9. A method of purifying compounds of metals of the group consisting of uranium and thorium wherein an impure compound of such metal is extracted with an organic solvent of the group consisting of diethyl ether, methyl acetate, butyl acetate, methyl isobutyl ketone and nitro methane containing a small proportion of acid, passing the extract through an adsorbent mass of a substance of the group consisting of cellulose, cellulose acetate, activated alumina, calcined ball clay, alginic acid and ion exchange resins, and collecting a solution of the purified compound of the metal in the organic solvent which has passed through the adsorbent mass.

References Cited in the file of this patent

Misciatelli: Chemical Abstracts, vol. 23, p. 1554 (1929). (Copy in Scientific Library.)

Getman et al.: Outlines of Theoretical Chemistry, 5th ed., p. 238 (1931); John Wiley & Sons, Inc., New York.

Fischer et al.: Naturwissenschaften, vol. 25, pg. 348 (1937). (Copy in Scientific Library.)